May 12, 1970 R. W. DECKER 3,512,002
RADIATION SENSITIVE COUNTING METHOD AND APPARATUS
Filed June 14, 1965 3 Sheets-Sheet 1
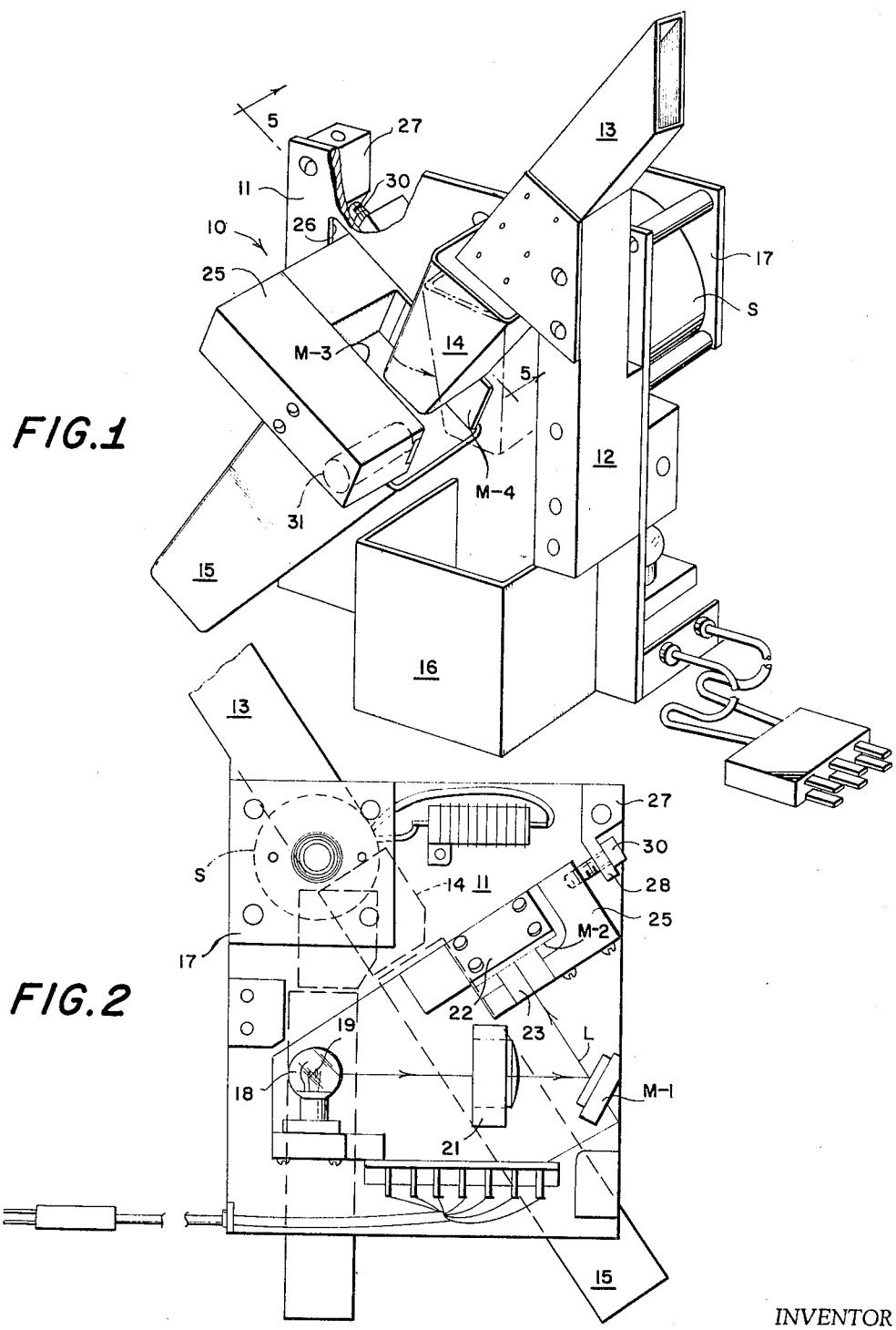
INVENTOR
ROBERT W. DECKER
BY Irvin A. Lavine
ATTORNEY May 12, 1970 R. W. DECKER 3,512,002
RADIATION SENSITIVE COUNTING METHOD AND APPARATUS
Filed June 14, 1965 3 Sheets-Sheet 2
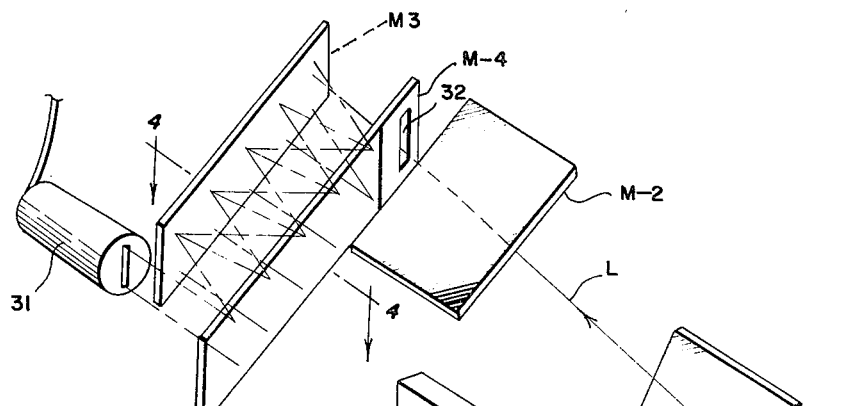
FIG.3
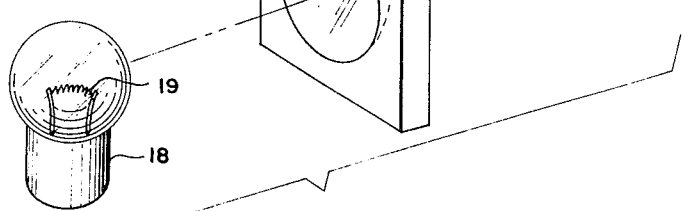
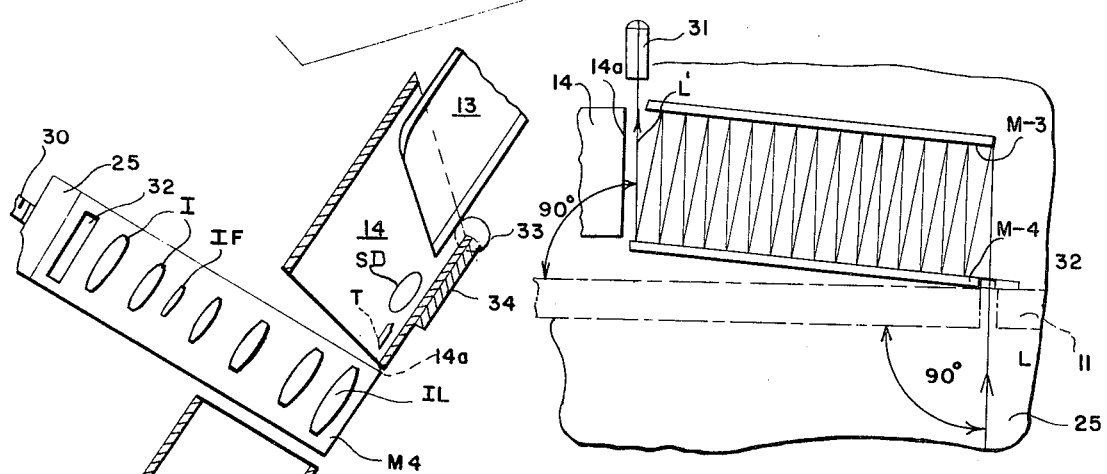
FIG.4
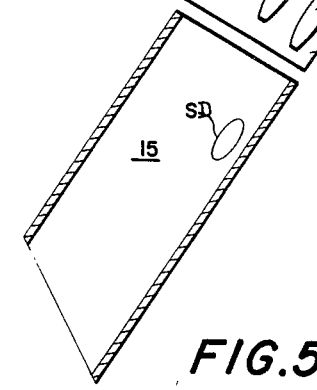
FIG.5
INVENTOR
ROBERT W. DECKER
BY *Irvin A. Lavine*
ATTORNEY INVENTOR
ROBERT W. DECKER
BY *Irvin A Lavine*
ATTORNEY

United States Patent Office 3,512,002
Patented May 12, 1970

3,512,002
RADIATION SENSITIVE COUNTING METHOD AND APPARATUS
Robert W. Decker, Washington, D.C.
(11313 Frederick Ave., Beltsville, Md. 20705)
Filed June 14, 1965, Ser. No. 463,690
Int. Cl. G06m 7/00; H01j 39/12
U.S. Cl. 250—222                    16 Claims

ABSTRACT OF THE DISCLOSURE

An invention relating to a method of counting and to apparatus therefor, and more particularly to counting method and apparatus which avoids the counting of "trash," and which apparatus includes a circuit which obviates the use of a solenoid switch.

---

It is often necessary to count relatively small objects such as small metal parts and seeds. There has been provided apparatus for counting such small articles, and such apparatus has been a great improvement over the formerly used manual counting. However, certain problems have arisen with the known counting apparatus.

One major problem has been the inaccuracy of the counters. Such counters are often provided with a path along which the articles to be counted are passed, in series. A light beam is passed across the article path, and there may be either a single legged light beam, or a multiple-legged light beam; in either case, the light beam strikes a light sensitive element, such as a photo-electric cell, and when the light beam is broken by an article to be counted, it changes the condition of the cell which thereby provides a signal to a counting circuit. In theory, such an organization should work with a high degree of accuracy, but in practice this has not been found to be the case in a sufficiently consistent manner. It has now been discovered that the inaccuracies of the known counters are largely over-counts, in which the counting apparatus indicates a greater number of articles than has actually been passed through the apparatus. After careful investigation, it has been discovered that the reason for the over-counting is that the counting apparatus has counted not only the articles, but has also counted "trash."

When relatively small parts are manufactured of metal, plastic, or the like, it has now been discovered that relatively small metal shavings or other pieces are included in the lot of articles to be counted. Similarly, with the counting of seeds, a husk or similar part of a seed may be detached from the main seed, and included in a batch of seeds to be counted. This occurs with both relatively large seeds, such as corn, and relatively small seeds, such as grass seeds, as well as seeds of intermediate size. In either situation, the small particle included in the batch of articles to be counted is sufficiently large so that when passing through the light beam, it will alter the condition of the photo-electric cell (or similar light sensor) to a sufficient degree that a signal will be given to the counting circuit. These small particles are the "trash" referred to herein.

Another problem with the counters heretofore known has been an unsatisfactorily short operating life before the occurrence of a failure. In particular, counting apparatus heretofore known has utilized a solenoid-actuated element in which a relatively large current has been initially supplied to the solenoid to overcome its inertia and cause it to actuate the element to which it is connected, and then a switch has been closed to reduce the amount of current flowing through the solenoid, this being known as the "holding current." The switch associated with the solenoid has frequently been the first of the circuit to give trouble, thereby requiring maintenance and repair of the counting apparatus after a relatively few uses. By this it is meant that counting apparatus are usually employed to count a relatively small batch, such as one hundred articles, but many batches are to be counted, and the difficulty has arisen after the counting of a fewer number of batches than is desirable.

An object of the present invention is the provision of a method of counting a batch of articles and not counting the "trash" in the batch.

Another object of the present invention is to provide a counting apparatus of greatly improved accuracy.

Another object of the present invention is the provision of a counting apparatus which is reliable in operation over an extended period of time and a great number of cycles.

A further object of the present invention is to provide a counting apparatus which will accurately count articles but which will not count "trash."

A still further object of the present invention is the provision of a counting apparatus which can be adjusted so as to accurately count different sizes of articles.

Yet another object of the present invention is to provide a counting apparatus having an improved counting circuit.

Another object of the present invention is the provision of a counting apparatus circuit which avoids use of solenoid or other motor switch.

Other objects and many attendant advantages of the present invention will be readily understood from the following specification and drawings, wherein:

FIG. 1 is a perspective view of a counting apparatus in accordance with the present invention, with parts broken away.

FIG. 2 is an elevational view of the counting apparatus shown in FIG. 1, taken from the side opposite to that shown in FIG. 1.

FIG. 3 is a diagrammatic showing of the optical system of the present invention.

FIG. 4 is a view of a part of the optical system of the present invention, taken on the line 4—4 of FIG. 3.

FIG. 5 is a cross-sectional view taken on the line 5—5 of FIG. 1.

Figure 6:
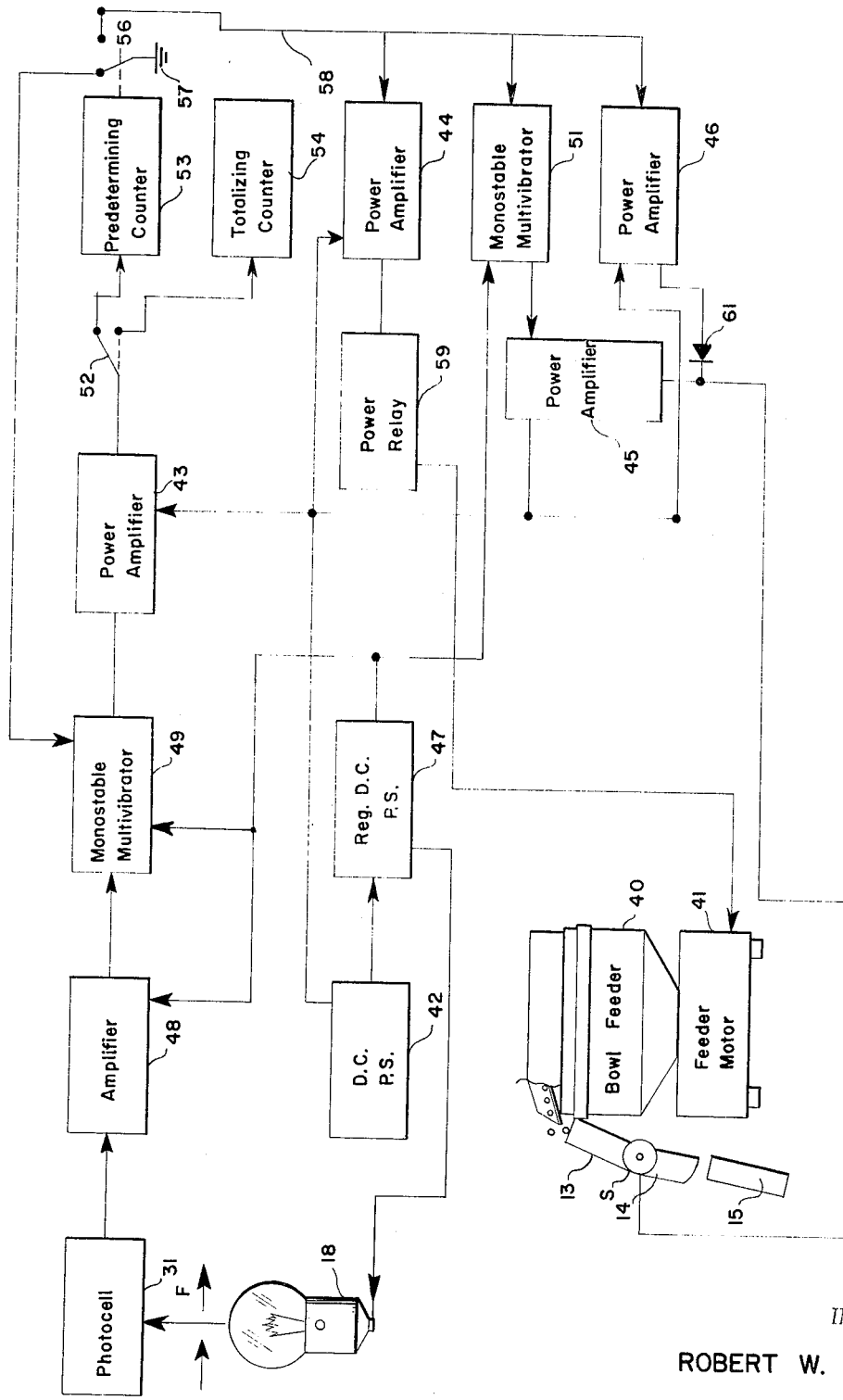
FIG. 6 is a circuit diagram, with associated parts, in accordance with the present invention.

The following description is of a preferred apparatus embodying the inventive concept, although it is to be appreciated that certain features may be otherwise than as herein specifically disclosed.

Referring now to the drawings, wherein like or corresponding reference numerals are used to designate like or corresponding parts throughout the several views, there is shown in FIG. 1 a counting apparatus generally designated 10 and including a vertically extending base plate 11. A support 12 secured to base plate 11 holds an upper inclined receiving chute 13, which is preferably of rectangular cross section. The chute 13 is adapted to receive articles to be counted from a feeding apparatus, such as a well-known vibrating bowl feeder. Below and generally in line with the receiving chute 13 is a pivoted diverter chute 14, and below diverter chute 14, and spaced therefrom, is a delivery chute 15. Diverter chute 14 is preferably tapering so that it is somewhat smaller at its discharge mouth, and the delivery chute is preferably also of this configuration. Each of the chutes 13, 14 and 15 has a bottom panel which is so positioned that any line of intersection between the panel and a vertical plane will be horizontal. The diverter chute 14 is mounted for rotation about a horizontal axis, so that it may be rotated to the dotted line position shown in FIG. 1 to thereby discharge articles into the alternate chute 16.

Referring now to FIG. 2, there may be seen the counting apparatus 10 from the opposite side, there being shown a solenoid S of the rotary type and secured to an auxiliary mounting plate 17. The optical system includes a light 18 having a filament 19, a focusing lens 21, and a first mirror M–1 for redirecting the light beam from light source 18 and lens 21. Mirror M–1 directs the light beam upwardly to a mirror M–2, which is held by a mounting plate 22 in a skew plane; that is, it is inclined both to the horizontal and the vertical. Mounting plate 22 is positioned on a mount element 25 which includes an aperture 23 to permit the passage of light from mirror M–1 to mirror M–2. Mount element 25 (see also FIG. 1) extends through an elongated slot 26 in base plate 11, slot 26 being inclined and substantially perpendicular to the axis of the chutes 13, 14 and 15. Also mounted on the base plate 11, and visible in FIG. 2, is a support member 27 having a threaded flange 28; threadedly engaged in flange 28 and in mounting element 25 is an adjusting screw 30, the purpose of which is to move mount element 25 in the direction of slot 26.

In FIG. 3, there is shown in diagrammatic form the optical system of the counting apparatus of the present invention, there being shown therein the light source 18 with filament 19, the focusing lens 21 which serves to focus an image of filament 19, the mirror M–1, the mirror M–2, the mount element 25, adjusting screw 30, mirrors M–3 and M–4 and the photo-electric cell 31. The mirror M–3 receives the light beam L through the aforementioned aperture in base plate 11 and an aperture 32 in mirror M–4. Because the light beam L strikes the mirror M–3 at an acute angle, and because mirrors M–3 and M–4 are substantially parallel, the light beam is reflected in a zig-zag manner between the two mirrors M–3 and M–4 until by incremental progression, the light beam traverses the length of the mirrors M–3 and M–4, and the last leg L' of the zig-zag path of the light beam L is reflected from mirror M–4 to the photo-electric cell 31. The space between mirrors M–3 and M–4 is thereby substantially completely traversed at every point by one or another leg of the zig-zag path of the light beam L, so that it is substantially impossible for an article to pass through the space without either wholly or partially breaking the light beam; in either event, there results a significant change in the condition of photo-electric cell 31, so that it emits a signal or otherwise varies its electrical output so as to initiate a count in the attached circuit.

Referring now to FIG. 4, there is shown the base plate 11, which is the basic reference structure for the optical system. There is also shown the mount element 25, broken away, and the mirrors M–3 and M–4, as well as the photo-electric cell 31. The light beam L passes through the slot 26 (not shown) and strikes the mirror M–3 after passing through the slot 32 in mirror M–4. The mirrors M–3 and M–4 are substantially parallel to each other, and are at a slight angle to the plane of base plate 11, thereby causing the light beam L to strike mirror M–3 at a small acute angle. This causes the light to be reflected back and forth between the mirrors M–3 and M–4 in the aforementioned zig-zag path, with the last leg L' of the light beam L being reflected from the mirror M–4 to the photo-electric cell 31, this last leg L' being perpendicular to the base plate 11, as indicated.

Referring now to FIG. 5, there are shown the chutes 13, 14 and 15, the mirror M–4, and the mount element 25 and adjusting screw 30, the representation being somewhat diagrammatic for purposes of clarity. On the surface of the mirror M–4 are a series of images I, these being representations of the dimension and focus of the light beam L as it strikes and reflects from the mirror M–4 at a series of positions therealong. The image IF is the one which is closest to being in focus, being at the focal distance of the lens 21, and being an image of the filament 19. The other images I, being at different lengths from the lens 21 are less sharp, and are somewhat out of focus. The last image IL marks the beginning of the last leg L' of the light beam L, and is one which directs the leg L' towards the observer, and thus into the photo-electric cell 31 (not shown). The lip 14a of chute 14 is substantially horizontal, and the last leg L' extends substantially parallel to lip 14a, as is indicated in FIG. 5 and shown in FIG. 4. A seed S shown in chute 15 will have passed down chute 14 and through the light beam L, thereby altering or breaking it sufficiently to cause a response by the photo-electric cell 31. On the other hand, a bit of trash T will have fallen between the lip 14a and the last leg L' of the light beam L, without interrupting it, thereby avoiding a response of the photo-electric cell 31 to the trash T, and avoiding a mis-count. The position of the zig-zag light beam relative to the lip 14a, and in particular the position of the last leg L' and the last image IL will have been adjusted for the particular material being counted by means of adjusting screw 30. This has been accomplished in the present disclosed embodiment of the invention by moving the entire mount element 25 by means of adjusting screw 30 to thereby vary its position in the slot 26 towards or away from lip 14a, and this in turn has permitted variation and adjustment of the position of the last leg L' of the light beam L relative to the lip 14a of chute 14.

There has also been shown in FIG. 5 in dash lines the solenoid S, its shaft 33 and the bracket 34 which connects the chute 14 with the shaft 33 and thereby with the solenoid S.

It will be appreciated that the chute 14 serves to establish a course for both articles and particles (or "trash"), which take different paths within that general course. The zig-zag light beam is a field which is sensitive to the passage of articles and has a sensory boundary, the leg L', which is between the paths of the articles and the trash T. In operation, therefore, articles will pass through the light field and cause the photo-electric cell 31 to change its condition, and give a signal to the counting circuit.

Referring now to FIG. 6, there is shown a bowl feeder 40 which is energized by a feeder motor 41 and which contains a batch of articles and causes the articles to be fed therefrom by a vibratory movement. The bowl feeder 40 discharges into the receiving chute 13, the diverter chute 14 and the delivery chute 15; the diverter chute 14 may be rotated by the solenoid S, although a motor and clutch arrangement may be used in place of the solenoid in certain installations. There may also be seen in FIG. 6 the light source 18 and the photo-electric cell 31. In this schematic and diagrammatic showing the field of light is represented by the arrow F.

A direct current power supply 42 is provided and supplies energy to power amplifiers 43, 44, 45 and 46, as well as to the regulated direct current power supply 47. Regulated direct current power supply 47 supplies current to the light source 18 as well as to amplifier 48, monostable multivibrator 49, and monostable multivibrator 51. The output of power amplifier 43 is connected through a switch 52 to either a predetermining counter 53 or a totalizing counter 54. Predetermining counter 53 controls a switch 56 which connects a direct current return 57 either to a terminal that is connected to monostable multivibator 49 or to a terminal which is connected with conductor 58. Conductor 58 is connected by means of a first path including power amplifier 44 and a power relay 59 to a switch controlling the feeder motor 41, to a second path including monostable multivibrator 51 and power amplifier 45, which second path is connected to the solenoid S, and conductor 58 is also connected by means of a third path to the solenoid S, the third path being in parallel to the aforementioned second path and including the power amplifier 46 and a diode 61.

In operation, energization of the feeder motor 41 causes the bowl feeder 40 to feed articles to the receiving chute 13, into which they drop sequentially. The articles pass along the course defined by the chutes 13, 14 and 15, each article in turn altering the field F between the light source 18 and photo-electric cell 31. Each alteration of the light field F is sensed by photo-electric cell 31, which then changes its condition, it being understood that photo-electric cell 31 may be either conducting or nonconducting when the field F is not altered. In either case, as a result of the alteration of the field F by each of the articles descending along the course, a signal is supplied to the power amplifier 38, which then energizes the monostable multivibrator 49, the pulse from which is amplified through power amplifier 43 and is supplied to the predetermining counter 53 through switch 52. In its preferred form, predetermining counter 53 is set so that it counts backwards from the preselected number, and upon reaching zero the switch 56 is thrown; this breaks the connection between the direct current return 57 and monostable multivibrator 49, thus preventing any further input of energy to predetermining counter 53. Also, direct current return 57 is connected with conductor 58 thereby energizing the first path so that power amplifier 44 actuates power relay 59 to operate the switch of feeder motor 41 and thereby deenergize it and bowl feeder 40, thus stopping the feeding of articles. The second path is energized, causing monostable multivibrator 51 to supply a pulse to power amplifier 45, which causes a pulse of relatively high energy, such as 36 volts, to be fed to the solenoid S, energizing it, causing the diverter chute 14 to be shifted, and also serving to block the flow of current through diode 61. Because of the blocking voltage applied to diode 61, there will not be, initially, any flow of current through the third path. When the pulse from the monostable multivibrator 51 has ended, however, power amplifier 46 will have been turned on and current will flow through it and diode 61 to the solenoid S, thus providing a holding current on solenoid S which is at a lower value than the starting currents supplied through the second path.

It will thus be seen that the circuitry disclosed in FIG. 6 provides for the initiation of the movement of solenoid S, and thereafter the application of holding current to it is accomplished without the necessity of closing a switch at the solenoid.

There has been provided an exemplary counting apparatus capable of passing articles and small particles, herein designated as "trash," along a course in juxtaposition to which is a field of light, preferably formed by a zig-zag light beam. The construction is such that the trash follows a path outwardly of a sensory boundary of the light field, and is thereby not counted. Further, the electric circuit connected with the optical system and a diverter element for the articles being fed is constructed so that there is no switch at the solenoid or other motor which operates the diverter, thereby obviating a cause of difficulty in counter circuits heretofore known.

There has also been disclosed a method for counting only articles from a batch which contains both articles and particles which are of relatively small size in comparison to the articles to be counted, herein referred to as "trash," which method enables the counting of articles to be accomplished quickly and accurately, without miscounts due to "trash."

It will be obvious to those skilled in the art that various changes may be made without departing from the spirit of the invention and therefore the invention is not limited to what is shown in the drawings and described in the specification but only as indicated in the appended claims.

What is claimed is:

1. Apparatus for counting particles comprising a vertical base plate, an upper inclined receiving chute secured to one side of said base plate, a diverter chute pivoted on said base plate and positioned to receive articles leaving said upper chute, said diverter chute being inclined in a first position thereof, a delivery chute on said base plate spaced from and positioned to receive articles from said diverter chute in said first position thereof, a source of light and focusing lens means for forming a light beam secured on the opposite side of said base plate, an opening through said base plate, mirror means on the opposite side of said base plate for receiving the light beam and directing it through said opening, a pair of parallel mirrors on said one side of said base plate, one said mirror receiving the light beam through said opening at an acute angle and reflecting said beam to said other mirror, whereby to provide a zig-zag light path between said mirrors, means for mounting said mirrors in the space between said diverter chute and said delivery chute with said mirrors lying in planes generally perpendicular to the bottom wall of said diverter chute, means for adjusting the position of said zig-zag light beam relative to said diverter chute, light responsive electrical means for receiving said light beam, and circuit means connected to said last mentioned means for counting the articles which break said light beam.

2. The apparatus of claim 1, said circuit means including means responsive to a predetermined count for energizing a motor, means connecting said diverter chute to said motor for causing said diverter chute to pivot upon energization of said motor.

3. The apparatus of claim 2, said circuit means including means for applying a starting current and a holding current in sequence to said motor consisting of electrical circuit means having components which remain physically connected to each other during said sequence.

4. In article counting apparatus, inclined elongate chute means for guiding descending articles and including a discharge opening having a lower lip, means for establishing a zig-zag light beam path below and adjacent said discharge opening transverse to the path of descending articles with one leg of said light beam path extending substantially parallel to said lower lip, and means for adjusting the relative position of at least said one leg and said lip to exclude particles from said light beam path, light responsive electrical means for receiving said light beam, and circuit means connected to said last mentioned means for counting the articles which break said light beam.

5. In article counting apparatus, inclined elongate chute means for guiding descending articles and including a discharge opening having a lower lip, means for establishing a field of light below and adjacent said discharge opening whereby descending articles will pass through said field of light, said field having a boundary substantially parallel to said lower lip, means for adjusting the relative position of said boundary and said lip to thereby permit particles descending said chute to avoid said field of light, light responsive electrical means for receiving said light beam, and circuit means connected to said last mentioned means for counting the articles which pass through said field of light.

6. In article counting apparatus, inclined elongate chute means for guiding descending articles and including a discharge opening having a lower lip, means for establishing a field of radiant energy below and adjacent said discharge opening whereby descending articles will pass through said field, said field having a boundary adjacent said lip, means for sensing the passage of an article through said field, means for adjusting said boundary of said field relative to said lip whereby to permit descending particles to pass outside said field, electrical means responsive to said radiant energy, and circuit means connected to said last mentioned means for counting articles which pass through said field.

7. A method for counting only the articles in a batch which includes articles and relatively smaller particles, comprising serially passing said articles and particles along a course, establishing a sensory field in juxtaposition to said course, adjusting the sensory field relative to said course to permit sensing of articles and to exclude particles from said sensory field, sensing variation in said field due only to the passage of articles, and counting the number of variations occurring in said field.

8. A method for counting only the articles in a batch which includes articles and relatively smaller particles, comprising serially passing said articles and particles along a path, establishing a field of radiant energy in juxtaposition to said path, adjusting the radiant energy field relative to said path to permit sensing of articles and to exclude particles from said radiant energy field, sensing variations in said radiant energy field due only to the passage of articles, and counting the number of variations occurring in said field.

9. A method for counting only the articles in a batch which includes both articles and relatively smaller particles comprising serially passing said articles and particles along a course so that at least over a portion of said course said articles and particles move along different paths, establishing a sensory field capable of sensing the passage of articles and having a sensory boundary in a position relative to said course so that the paths of articles and particles are on opposite sides of said sensory boundary, sensing variations in said field due to the passage of articles therethrough, and counting the number of variations occurring in said field.

10. The method of claim 9, said field being a radiant energy field.

11. In a counting system, means for establishing a field of light including a light source, a photoelectric cell for receiving light from said light source, means for feeding articles from a batch including a motor, means for defining a course for articles fed by said feeding means and including diverter means, motor means for actuating said diverter means, and circuit means for counting variations in said field of light due to passage of articles and including counting means connected to said photo-electric cell for producing an output signal after receiving a predetermined number of input signals from said photo-electric cell, a first path from said counting means to said motor means and including monostable multivibrator means, a second path parallel to said first path and including in series amplifier means and a diode, whereby upon the counting of a predetermined number of articles the counting means will pulse said monostable multivibrator to both energize said motor means and block said diode for the duration of said pulse.

12. In a counting system, means for establishing a field of light including a light source, a photo-electric cell for receiving light from said light source, means for feeding articles from a batch including a motor, means for defining a course for articles fed by said feeding means and including diverter means, motor means for actuating said diverter means, and circuit means for counting variations in said field of light due to passage of articles and including counting means connected to said photo-electric cell for producing an output signal after receiving a predetermined number of input signals from said photo-electric cell, a first path from said counting means to said motor means and including monostable multivibrator means, a second path parallel to said path and including in series amplifier means and diode means, capable of passing current only from said amplifier whereby upon the counting of a predetermined number of articles the counting means will pulse said monostable multivibrator to both energize said motor means and block diode means for the duration of said pulse.

13. In a counting system, means for establishing a field of light, a photo-electric cell for receiving light from said light source, means for feeding articles from a batch, means for defining a course for articles fed by said feeding means and including diverter means, motor means for actuating said diverter means, and circuit means for counting variations in said field of light due to passage of articles and including counting means connected to said photo-electric cell for producing an output signal after receiving a predetermined number of input signals from said photo-electric cell, a first path from said counting means to said motor means and including monostable multivibrator means, a second path parallel to said first path and including in series amplifier means and a diode, whereby upon the counting of a predetermined number of articles the counting means will pulse said monostable multivibrator to both energize said motor means and block said diode for the duration of said pulse.

14. In a counting system, means for establishing a field of radiant energy, means for feeding articles from a batch, means for defining a course for articles fed by said feeding means and including diverter means, motor means for actuating said diverter means, and circuit means for counting variations in said field due to passage of articles and including counting means for producing an output signal after receiving a predetermined number of input signals, a first path from said counting means to said motor means and including monostable multivibrator means, a second path parallel to said first path and including in series amplifier means and a diode, whereby upon the counting of a predetermined number of articles the counting means will pulse said monostable multivibrator to both energize said motor means and block said diode.

15. In a counting system, means for establishing a field of radiant energy, means for feeding articles from a batch, means for defining a course for articles fed by said feeding means and including diverter means, motor means for actuating said diverter means, and circuit means for counting variations in said field due to passage of articles and including counting means for producing an output signal after receiving a predetermined number of input signals, said circuit means including means for applying a starting current and a holding current in sequence to said motor consisting of electrical circuit means having components which remain physically connected to each other during said sequence.

16. In article counting apparatus,
inclined means for guiding descending articles therealong and including discharge lip means,
means for establishing a sensoring field in juxtaposition with said inclined means and having a boundary adjacent said discharge lip means,
means for sensing an altering of said field due to the passage of an article,
means for adjusting at least said boundary of said field relative to said discharge lip means to exclude particles from said field,
and means connected with said sensing means for counting alterations of said sensory field.

References Cited

UNITED STATES PATENTS

| 2,646,880 | 7/1953 | Frankel | 88—14 X |
| 3,041,462 | 6/1962 | Ogle | 250—219 |
| 3,185,851 | 5/1965 | D'Emilio | 250—223 |
| 3,327,847 | 6/1967 | Lockshaw | 209—111.5 X |
| 3,327,850 | 6/1967 | Simmons | 250—223 X |
| 3,344,799 | 10/1967 | Hardin | 250—223 X |

WALTER STOLWEIN, Primary Examiner

U.S. Cl. X.R.

209—111.5; 250—223